(12) United States Patent
Zhu et al.

(10) Patent No.: US 11,386,329 B2
(45) Date of Patent: Jul. 12, 2022

(54) METHOD OF PROCESSING IMAGE DATA IN A CONNECTIONIST NETWORK

(71) Applicant: Aptiv Technologies Limited, St. Michael (BB)

(72) Inventors: Weimeng Zhu, Wuppertal (DE); Jan Siegemund, Cologne (DE)

(73) Assignee: Aptiv Technologies Limited, St. Michael (BB)

( * ) Notice: Subject to any disclaimer, the term of this patent is extended or adjusted under 35 U.S.C. 154(b) by 889 days.

(21) Appl. No.: 16/202,688

(22) Filed: Nov. 28, 2018

(65) Prior Publication Data

US 2019/0171939 A1 Jun. 6, 2019

(30) Foreign Application Priority Data

Dec. 5, 2017 (EP) .................................... 17205540

(51) Int. Cl.
*G06N 3/00* (2006.01)
*G06N 3/08* (2006.01)
(Continued)

(52) U.S. Cl.
CPC ........... *G06N 3/084* (2013.01); *G06N 3/0454* (2013.01); *G06N 20/00* (2019.01); *G06V 10/454* (2022.01); *G06V 20/58* (2022.01); *G06V 20/582* (2022.01)

(58) Field of Classification Search
CPC ...... G06N 3/084; G06N 20/00; G06N 3/0454; G06V 20/58; G06V 10/454; G06V 20/582
See application file for complete search history.

(56) References Cited

U.S. PATENT DOCUMENTS 9,760,806 B1 9/2017 Ning et al.
10,701,394 B1 6/2020 Caballero
(Continued)

FOREIGN PATENT DOCUMENTS

WO 2016/160237 A1 10/2016

OTHER PUBLICATIONS

"Foreign Office Action", EP Application No. 18168781.5, dated Jun. 4, 2021, 6 pages.
(Continued)

*Primary Examiner* — Md K Talukder
(74) *Attorney, Agent, or Firm* — Sawtooth Patent Group PLLC

(57) ABSTRACT

A method of processing image data in a connectionist network includes: determining, a plurality of offsets, each offset representing an individual location shift of an underlying one of the plurality of output picture elements, determining, from the plurality of offsets, a grid for sampling from the plurality of input picture elements, wherein the grid comprises a plurality of sampling locations, each sampling location being defined by means of a respective pair of one of the plurality of offsets and the underlying one of the plurality of output picture elements, sampling from the plurality of input picture elements in accordance with the grid, and transmitting, as output data for at least a subsequent one of the plurality of units of the connectionist network, a plurality of sampled picture elements resulting from the sampling, wherein the plurality of sampled picture elements form the plurality of output picture elements.

20 Claims, 5 Drawing Sheets

(51) Int. Cl.
*G06N 3/04* (2006.01)
*G06N 20/00* (2019.01)
*G06V 10/44* (2022.01)
*G06V 20/58* (2022.01)

(56) References Cited

U.S. PATENT DOCUMENTS

| | | | |
|---|---|---|---|
| 10,739,773 | B2 | 8/2020 | Vernaza et al. |
| 11,049,018 | B2 | 6/2021 | Yang et al. |
| 11,195,038 | B2 | 12/2021 | Nunn et al. |
| 2007/0022063 | A1 | 1/2007 | Lightowler |
| 2015/0071561 | A1* | 3/2015 | Hsieh .................. G06T 5/002 382/264 |
| 2016/0283864 | A1* | 9/2016 | Towal .................. G06V 10/82 |
| 2017/0193310 | A1 | 7/2017 | Yu et al. |
| 2017/0255832 | A1 | 9/2017 | Jones et al. |
| 2018/0096259 | A1 | 4/2018 | Andrews et al. |
| 2018/0144193 | A1* | 5/2018 | Tang .................. G06N 3/084 |
| 2018/0211403 | A1 | 7/2018 | Hotson et al. |
| 2018/0232947 | A1 | 8/2018 | Nehmadi et al. |
| 2019/0042850 | A1 | 2/2019 | Jones et al. |
| 2019/0114818 | A1* | 4/2019 | Lin .................. G06T 5/30 |
| 2019/0122378 | A1* | 4/2019 | Aswin .................. G06T 5/003 |
| 2019/0124346 | A1 | 4/2019 | Ren et al. |
| 2019/0171939 | A1* | 6/2019 | Zhu .................. G06N 3/0454 |
| 2019/0325241 | A1 | 10/2019 | Nunn et al. |
| 2019/0325306 | A1 | 10/2019 | Zhu et al. |
| 2019/0347485 | A1 | 11/2019 | Yang et al. |
| 2020/0301013 | A1 | 9/2020 | Banerjee et al. |
| 2021/0104086 | A1 | 4/2021 | Wang et al. |

OTHER PUBLICATIONS

"Notice of Allowance", U.S. Appl. No. 16/374,138, filed Jul. 9, 2021, 13 pages.
Chung, et al., "A Two Stream Siamese Convolutional Neural Network for Person Re-identification", Dec. 2017, pp. 1992-2000.
Du, et al., "Recurrent Spatial-temporal Attention Network for Action Recognition in Videos", Mar. 2018, pp. 1347-1360.
Peng, et al., "Multi-region Two-stream R-CNN for Action Detection", Sep. 2016, pp. 744-759.
Wang, "Two-Stream SR-CNNs for Action Recognition in Videos", Jan. 2016, 12 pages.
"Foreign Office Action", EP Application No. 18168786.4, dated Sep. 2, 2021, 4 pages.
"Summons to Attend Oral Proceedings", EP Application No. 1720540. 2, dated Jul. 30, 2021, 6 pages.
"Extended European Search Report", EP Application No. 18168786. 4, dated Oct. 16, 2018, 10 pages.
"Extended European Search Report", EP Application No. 18168781. 5, dated Oct. 29, 2018, 11 pages.
"Non-Final Office Action", U.S. Appl. No. 16/374,138, dated Aug. 19, 2020, 17 pages.
Cho, "Learning Phrase Representation using RNN Encoder-Decoder for Statistical Machine Translation", Sep. 3, 2014, 15 pages.
Chung, "Empirical Evaluation of Gated Recurrent Neural Networks on Sequence Modeling", Dec. 11, 2014, 9 pages.
Dai, et al., "Deformable Convolutional Networks", Jun. 5, 2017, 12 pages.
Dequaire, et al., "Deep Tracking in the wild: End-to-end tracking using recurrent neural networks", Jun. 22, 2017, pp. 492-512.
Fayyaz, et al., "STFCN: Spatio-Temporal FCN for Semantic Video Segmentation", Sep. 2, 2016, 17 pages.
Hubel, et al., "Receptive Fields, Binocular Interaction and Funtional Archtecture in Cat's Visual Cortex", Jul. 1961, pp. 106-154.
Jaderberg, et al., "Spatial Transformer Networks", Feb. 4, 2016, 15 pages.
Long, et al., "Fully Convolutional Networks for Semantic Segmentation", Mar. 8, 2015, 10 pages.
McLaughlin, et al., "Recurrent Convolutional Network for Video-Based Person Re-Identification", Jun. 27, 2016, pp. 1325-1334.
Ondruska, et al., "Deep Tracking: Seeing Beyond Seeing Using Recurrent Neural Networks", Mar. 8, 2016, 8 pages.
Patraucean, et al., "Spatio-temporal video autoencoder with differentiable memory", Sep. 1, 2016, 13 pages.
Qi, et al., "PointNet: Deep Learning on Point Sets for 3D Classification and Segmentation", Conference on Computer Vision and Pattern Recognition (CVPR) 2017, Jul. 2017, pp. 652-660.
Ren, et al., "Faster R-CNN: Towards Real-Time Object Detection with Region Proposal Networks", Jan. 6, 2016, 14 pages.
Ronnenberger, et al., "U-Net: Convolutional Networks for Biomedical Image Segmentation", May 18, 2015, 8 pages.
Shi, et al., "Convolutional LSTM Network: A Machine Learning Approach for Precipitation Nowcasting", Sep. 15, 2015, 12 pages.
Tokmakov, "Learning Video Object Segmentation with Visual Memory", Jul. 12, 2017, 11 pages.
Zhou, et al., "VoxelNet: End-to-End Learning for Point Cloud Based 3D Object Detection", Nov. 17, 2017, 10 pages.
"Final Office Action", U.S. Appl. No. 16/374,138, filed Feb. 8, 2021, 25 pages.
"Extended European Search Report", EP Application No. 17205540. 2, dated Jun. 11, 2018, 10 pages.
"Foreign Office Action", EP Application No. 17205540.2, dated May 4, 2020, 5 pages.

\* cited by examiner

METHOD OF PROCESSING IMAGE DATA IN A CONNECTIONIST NETWORK

TECHNICAL FIELD OF INVENTION

The invention relates to a method of processing image data in a connectionist network, in particular neural network, comprising a plurality of units, each unit having a data input, a data output, and at least one processing parameter. Processing of input data by means of a respective unit is at least partially determined by the at least one processing parameter of the unit.

BACKGROUND OF INVENTION

Connectionist networks are known in the field of machine learning, which usually involves some sort of algorithmic training during which suitable values for the processing parameters are derived on the basis of training data. In general, connectionist networks as described herein can be employed for supervised and unsupervised machine learning. However, the term connectionist network should be understood broadly and also covers models, which are not per se known as models trained by machine learning.

A connectionist network is a mathematically inspired model that is made up of interconnected processing units, wherein a given unit may have incoming connections from, or outgoing connections to, many other units. Accordingly, each unit has at least one data input and at least one data output. A plurality of units can be arranged in subsequent layers and interconnected with each other, as is commonly known from artificial neural network design. The plurality of units of a given network can have the same or different structures. Sometimes groups of units are employed, wherein the units of a given group have a common pre-defined structure that differs only between groups. As the skilled person understands, a connectionist network is preferably implemented as software, which means that the network structures described herein are not representing hardware structures but electronically implemented methods.

In general, connectionist networks can be employed for a wide variety of applications in which some sort of data processing is required. One application is image classification, which may involve classifying the content of an image or portions thereof into at least one of a plurality of pre-defined semantically meaningful groups. This is to say that raw image data acquired by means of an analog or digital image sensor is transformed into a discrete variable indicating a content or object class. In a traffic environment for example, a classifier can classify objects into one of the groups "vehicle", "pedestrian", and "unknown". Another application could be to transform the raw image data into a continuous variable that describes the content of the image. In a traffic environment, a distance variable can give the approximate distance to the nearest object.

A group of applications that has gained special interest in recent days is in the field of advanced driver assistance systems (ADAS), e.g., forward collision warning (FCW), pedestrian detection (PED), or traffic sign recognition (TSR). All of these applications involve an image classification, which is considered to be particularly challenging because, e.g., the relevant objects for classification are often only partially covered by an image or multiple objects are present in one image. Furthermore, objects often appear in spatially transformed versions, which deviate from a standard or canonical version of an object to which a given classifier is trained. One aspect, which is even more challenging, is that an object which should be assigned, i.e., classified to one group can have multiple different shapes. One example of this problem is the recognition of a simple traffic sign, which has a specific semantical meaning, i.e., "maximum allowable speed of 80 kilometres per hour is cancelled". While such a traffic sign usually includes the numeral 80 and a diagonal bar overlaying the numeral, the exact shapes of the involved objects, i.e., the font of the numeral 80 and the diagonal bar, may deviate between different countries, for example within the territory of the European Union.

As one non-limiting example of a connectionist network, an (artificial) neural network can be employed for the above mentioned classification tasks. As such, the connectionist network may comprise neural network structures, which are known in the art, e.g., fully connected layers and pooling layers. However, it turned out that the performance of even well trained neural networks, which may also comprise sophisticated structures, can greatly deteriorate when spatially transformed objects are to be classified, especially in combination with suboptimum conditions of image acquisition, which is often the case in outdoor traffic environments. Moreover, varying embodiments, i.e., versions or shapes, of an object to be classified often significantly reduce the "trained performance" of a classifier. The same problem can occur when image or other types of data is mapped on one or more continuous variables by means of multivariate regression models. This is to say that the problems are not only virulent with neural networks. As such, solutions according to the invention are in principle also applicable to arbitrary model types.

SUMMARY OF THE INVENTION

Described herein is a method for processing image data in a connectionist network, which overcomes the problems mentioned above. The method implements at least a respective one of a plurality of units of a connectionist network, in particular neural network, comprising a plurality of units, each unit having a data input, a data output, and at least one processing parameter, wherein processing of input data by means of a respective unit is at least partially determined by the at least one processing parameter of the respective unit of the connectionist network. The method includes:

receiving, as raw input data and/or input data processed by a preceding one of the plurality of units, a plurality of input picture elements representing an image acquired by means of an image sensor, determining, for a plurality of output picture elements, a plurality of offsets, each offset representing an individual location shift of an underlying one of the plurality of output picture elements, determining, from the plurality of offsets, a grid for sampling from the plurality of input picture elements, wherein the grid comprises a plurality of sampling locations, each sampling location being defined by means of a respective pair of one of the plurality of offsets and the underlying one of the plurality of output picture elements, sampling from the plurality of input picture elements in accordance with the grid, and transmitting, as output data for at least a subsequent one of the plurality of units of the connectionist network, a plurality of sampled picture elements resulting from the sampling, wherein the plurality of sampled picture elements form the plurality of output picture elements.

It has been found that the plethora of different forms a "target" object to be classified can appear in "real-life" conditions requires an approach on a sub-image level, i.e., on the level of individual picture elements forming an image. A complete transformation of the image, wherein all picture elements are transformed in the same way, is of course feasible in order to account for rotated or perspectively sheared objects. However, such a holistic transformation approach will not be sufficient when, e.g., two objects, which should be reliably classified into the same group, have substantially different shapes. Therefore, it is proposed to evaluate a plurality of offsets, which each describe a shift, i.e., a spatial translation of an individual output picture element. In other words, an offset defines a sampling location associated with an underlying output picture element. This sampling position can also be denoted as a resampling position since the picture elements forming the input data will usually be already the result of a sampling process. The picture element, which is sampled according to the sampling position can then be outputted preferably instead of one or more input picture elements within a local vicinity of the sampling location. In this way, it is possible to "focus" the image to more relevant parts of an image, wherein these more relevant parts form information that is suitable to improve the performance of the network, e.g., to reduce a classification error. This "focusing" or "reforming" approach can effectively be equivalent to compensating, i.e., rectifying specific differences between different versions of an object, which have been found to deteriorate the performance of a classifier network. In this sense, the method can be interpreted to represent a form of compensation resampling or dense translation sampling, wherein the input data is effectively warped, i.e., rectified. This special and innovative form of resampling has proven to be capable of modifying the input feature data in such a way that subsequent network parts are better able to reliably identify the content of the underlying image, i.e., model performance is improved. At the same time, this form of processing allows to keep subsequent network parts compact with respect to the complexity of their structure.

The method implements a respective unit in a connectionist network. In principle, the respective unit can be "inserted" into a predefined network structure and can thus also be integrated in a flexible manner into existing networks, which should be improved with regard to, e.g., challenging detection tasks. The respective unit can be interpreted as a dedicated pre-processing or sub-processing unit for a network. As such, the unit can receive a plurality of input picture elements either as raw input data or input data processed by a preceding unit that transmits its output to the unit implemented by the method. The term "raw input data" denotes input data, which has not been processed by the connectionist network. However, the input data can be pre-processed in other ways, for example by means of a post-processing unit associated with a camera system with which the input data has been acquired. As another example, the input data may be subject to a data reduction scheme leading to a reduced resolution. In principle, it is possible that the input data comprises a combination of raw input data and processed data.

Each of the offsets can form or represent a processing parameter of the unit implemented by the method. However, as will be described further below, the offsets can be determined by means of a separate unit or network, in particular by means of a localization connectionist network, wherein the determination of the offsets is controlled by processing parameters. This means that the offsets can be the result of a processing step, which is determined by trained processing parameters. However, since the offsets directly influence the processing of the unit implemented by the method, the offsets may be interpreted as variable and/or intermediate processing parameters of this unit. The offsets will usually vary with respect to the input data, wherein trained processing parameters are usually fixed after training of the network.

In general, a respective input or output picture element can comprise a position and a value, wherein the position can be a vector quantity and the value can be scalar quantity. The position can be described with respect to, e.g., a Cartesian, coordinate system, which can be the same for both the input and output picture elements. In particular, one "global" coordinate system may be used for both the input and output picture elements when the number of input and output picture elements is the same. Such a coordinate system can be limited to a number of discrete positions matching the number of input and/or output picture elements.

Preferably, the locations of the plurality of output picture elements can be described with respect to a coordinate system, which is used for describing the positions of the input picture elements. In particular, if the dimension of the input data, i.e., the number of input picture elements, deviates from the dimension of the output data, i.e., number of output picture elements, the positions of the output elements can be transformed into positions described in the coordinate system of the input data, for example by scaling the positional values. In this way, a respective sampling position can be described in the coordinate system associated with the input data, thereby simplifying the sampling of, i.e. from the input picture elements.

The step of determining the offsets is carried out for a plurality of output picture elements, which are preferably predefined before carrying out the method. For example, the number of output picture elements and an arrangement thereof, e.g., within a two-dimensional or three-dimensional matrix, can be defined. The arrangement of the output picture elements can represent a regular initial sampling grid, which can be described in the coordinate system of the input data. Then, for at least a portion of these predefined output picture elements, respective offsets are determined. Determining the grid from the offsets can then be interpreted as modifying or updating the regular initial sampling grid. The picture elements, which result from the sampling according to the grid, form the final output picture elements for which respective offsets have been determined.

If the dimension of the input data and the dimension of the output data are the same and if the arrangements of the input and output picture elements are the same, then the method can be simplified by determining each of the plurality of offsets for a respective one of the plurality of input picture elements. In this particular case, this is to say that each offset represents an individual location shift of an underlying one of the plurality of input picture elements. This can be done because the initial regular sampling grid, which is predefined from the output picture elements, matches with the sampling grid of the input picture elements, wherein the sampling locations are initially the same.

The input and output data can have a matrix configuration that represents an output configuration of an image sensor. For example, the input data can be a three dimensional matrix, wherein the third dimension (depth) comprises the number of channels of the image sensor, e.g., three channels of a RGB-sensor.

Advantageous embodiments of the invention are specified in the dependent claims, the description and the drawings.

According to a preferred embodiment, the individual location shift represented by a respective one of the plurality of offsets defines an arbitrary location relative to the underlying one of the plurality of output picture elements. In other words, each location shift is defined relative to an associated output picture element, which can also be described relative to an associated input picture element if the dimension of the input data and the dimension of the output data are the same and if the arrangements of the input and output picture elements (e.g., as a two or three-dimensional matrix) are the same. The shift can be described as a translation of the position of the output picture element, i.e., in form of a vector originating from the position of an output picture element and pointing to another position at which the image data represented by the input picture elements is "resampled". This is to say that a given offset only defines a shift in position but not of the content of the picture element itself. Preferably, offsets are determined for each of the plurality of picture elements forming the input data of the unit that implements the method. However, a given offset can define a zero shift, i.e., the location defined by the offset matches with the location of the underlying output picture element for which the offset is determined.

As an alternative to an offset being defined as an arbitrary location relative to an underlying one of the plurality of output picture elements, it is also possible to define an offset relative to an origin of a coordinate system of the input and/or output picture elements. In this way, an offset can be interpreted as a direct descriptor of a sampling position.

According to another embodiment sampling comprises interpolating a respective one of the plurality of output picture elements associated with a respective one of the plurality of sampling locations when the respective one of the plurality of sampling locations is offside any of the plurality of input picture elements. As an example, a given offset represents a location shift, which can be a fraction of the distance between adjacent input picture elements. In this case, the sampling location is between adjacent input picture elements. Therefore, in order to allow sampling at this sampling location, an (output) picture element is interpolated from the neighbouring (input) picture elements. This interpolated picture element is then the sampled picture element forming an associated output picture element, thereby also forming a portion of the output data. The interpolation can be carried out in a number of different ways and can be adapted to a type or a category of input data to be processed. In general, linear as well as non-linear interpolation schemes can be employed, e.g., 2D-nearest neighbour, bilinear and/or bicubic interpolation. Preferably, bilinear interpolation can be used because it can form a good compromise between computational load and accuracy.

At least some of the plurality of offsets can be spatially limited to a predefined threshold. This means that a given offset can be bounded or restricted to a predefined space around the underlying picture element. Such a limitation can be useful in order to avoid sampling locations which are not plausible and which may indicate overfitting of the unit implemented by the method, i.e., a given sampling location is useful in order to obtain a good model performance on a given set of training data but may severely deteriorate model performance on unseen test data. A spatial limitation for determining the offsets can be restricted to those underlying output picture elements adjacent to and inside an outer bounding box of the picture elements forming the input data. In particular, an offset limitation scheme can be configured such that sampling locations with a distance to the outer bounding box greater than a predefined threshold are avoided. A threshold or a group of thresholds for spatial limitation of at least some of the plurality of offsets can form a processing parameter or a group of processing parameters of the unit implemented by the method.

According to another embodiment determining the plurality of offsets is carried out by means of a localization connectionist network, in particular neural network, comprising one or more units, each unit having a data input, a data output, and at least one processing parameter, wherein processing of the input data by means of the one or more units is at least partially determined by the at least one processing parameter of the localization connectionist network. As before in connection with connectionist networks, the term localization connectionist network is understood in a broad sense, which means that this network can be implemented by any model, in particular those known in the field of machine learning, e.g., neural networks, support vector machines, or decision trees. The term localization can be interpreted with respect to the function of the offsets, namely to determine sampling locations, which form the grid. The processing parameters of the one or more units of the localization connectionist network can also form processing parameters of the unit implemented by the method. Preferably, predefined parameters of the output data, e.g., the number of output picture elements and the arrangement thereof, can form fixed processing parameters of the localization connectionist network, i.e., these processing parameters, which can also be denoted as hyper parameters, are not modified during training of the network.

In general, the one or more units of the localization connectionist network can be of any type, which is suitable to determine offsets for underlying picture elements. In particular, the one or more units of the localization connectionist network can be of the same type or can have the same structure as the plurality of units forming the connectionist network that can be arranged around the localization connectionist network. Preferably, one or more units of the localization connectionist network can be convolutional units, wherein a respective convolutional unit implements a convolution of at least some of the input picture elements (or processed versions thereof) received by the respective convolutional unit with a kernel filter, and wherein the sampling preferably does not comprise a convolution with a kernel filter. The kernel filter can be a matrix having a dimension smaller than the input data and forming a filter mask that is convolved with the input data in the manner of a sliding window involving calculating scalar products, as is well known to those skilled in the art. The kernel filter can be predefined or can be determined by at least one processing parameter, which can be a weight of the kernel filter, that is evaluated during training of the network. A convolutional unit can be used for pre-processing of the image data, wherein, e.g., blurring, sharpening, embossing, or edge detection can be accomplished, thereby enhancing the performance of the connectionist network, which can also be denoted as model performance. The kernel filter can have the advantage of reducing the computational load of the processing.

With regard to training of the connectionist network different training algorithms, e.g., the feed-forward algorithm and/or the back-propagation algorithm, can be used. Furthermore, the connectionist network and the localization connectionist network can be trained together or separately from each other. Preferably, an end-to-end training scheme is employed, i.e., at least a substantial part, preferably all processing parameters of the network under training are determined by algorithmic means only on the basis of training data and without manual tuning of the processing parameters. According to one embodiment the localization connectionist network is trained together with the connectionist network by means of the feed-forward algorithm and the back-propagation algorithm, wherein training comprises modifying the at least one processing parameter of at least some of the plurality of units of the connectionist network and/or of the one or more units of the localization connectionist network. As the case may be, the training of the connectionist network and the localization connectionist network can comprise modifying one or more processing parameters of the localization connectionist network only. This is because the processing parameters of the localization connectionist network may also be seen as processing parameters of the connectionist network. The modification of the processing parameters can be based on a gradient descent approach, in particular stochastic gradient descent, which is a first-order iterative optimization algorithm for finding the minimum of a (loss) function. The feed-forward algorithm and the back-propagation algorithm are well known in the art. The feed-forward algorithm involves processing input data by means of the connectionist network in the forward direction, i.e., in the normal processing direction that is also used in a desired use case. The output obtained from the network, e.g., an estimated class label, is then compared with the desired output, e.g., a desired class label. This error described by the (loss) function is used to change the processing parameters of the unit such that the error decreases gradually (minimization of the error via a gradient descent approach). This can be done using the back-propagation algorithm, which comprises iteratively passing batches of training data through the network and updating the processing parameters of the units, so that the error is reduced. Detailed exemplary descriptions of these algorithms can be found in Michael A. Nielsen, "Neural Networks and Deep Learning", Determination Press, 2015 (available online) or Gurney, Kevin, "An introduction to neural networks", CRC press, 1997. These references are incorporated herein by reference.

According to another embodiment, training data that is obtained from the localization connectionist network is selectively not used for modifying a processing parameter of a preceding unit of the connectionist network. In particular, during training of the localization connectionist network and the connectionist network and if the unit implemented by the method receives input data processed by a preceding one of the plurality of units of the connectionist network, training data information (e.g., gradient-related data for modifying the processing parameters) from the localization connectionist network is selectively not used for modifying the at least one parameter of the preceding one of the plurality of units of the connectionist network. For example in the case of training during back-propagation through the network, this means that the back-propagation path from the input of the localization connectionist network to the preceding unit can be selectively cut. In this way, it can be ensured that the peculiarities of the processing parameters of the localization connectionist network do not affect the training of the processing parameters of the preceding units, which may have a different purpose and which can have a different processing structure. It has been found that this interruption of dataflow during training can greatly enhance the performance of the connectionist network. The training data information (for actually modifying the processing parameters, e.g., gradient-related data), which is not passed to a preceding unit can comprise a gradient of a loss function, which represents the error change with respect to at least one processing parameter of the localization connectionist network. The preceding unit can be any respective one of the plurality of units of the connectionist network from which the localization connectionist network receives the input. Preferably, the dataflow during training is not cut at other parts of the connectionist network.

Preferably, the localization connectionist network and the connectionist network are trained before using the connectionist network for a predefined purpose. This is to say that the network is trained once and then preferably remains fixed while being in use. This has the advantage that the network can be used in mobile applications, i.e., in a vehicle, without requiring substantial computational resources.

In one preferred embodiment, the connectionist network implements a classifier for at least parts of the image represented by the plurality of picture elements. In this context, at least one object present in a given image can be classified into a respective one of a plurality of different groups. For example, it can be classified whether an object is a vehicle, a human being, or another type of object.

According to another embodiment at least one of the plurality of units of the connectionist network is a convolutional unit, wherein a respective convolutional unit implements a convolution of at least some of the plurality of picture elements or sampled picture elements received by the respective convolutional unit with a kernel filter. The use of convolutional units is often particularly advantageous for processing images, which comprise a large number of picture elements. A respective convolutional unit of the connectionist network can have the same type of kernel filter as a respective convolutional unit of the localization connectionist network. This can enhance model performance and can also accelerate model training. For example, the kernel filters can have the same size, e.g. 3×3, 2×2, or 5×5. However, the trained weights of the kernel filters, which can be processing parameters, will usually vary once the connectionist networks are trained.

According to a preferred embodiment the connectionist network implements a classifier for traffic signs. It has been found that a separate localization network as proposed herein is particularly effective for enhancing the performance of classifiers known from the art, e.g., a standard neural network. This is so because the localization network is not only able to cope with all sorts of changes in canonical perspectives including translations and shearings but can also deal with actual object variations, for example, due to different fonts, font sizes or symbols within traffic signs, which are often similar between countries but mostly not identical. This is a substantial advantage because even very challenging classification tasks can be handled with one holistic approach.

The picture elements resulting from the sampling can be transmitted as output data to a plurality of subsequent units of the connectionist network. In this way, the sampled picture elements can be reused several times and do not have to be calculated anew for each subsequent unit. This leads to a strong advantage compared to networks known from the art in which multiple units are often arranged in layers and receive data from only one preceding unit. The inventors have found that in such structures very similar data processing paths can occur, which means that there is a substantial amount of redundant data processing. With the invention, it is possible to reduce such inefficient processing. In particular, the output of the unit implemented by the method does not modify the data by means of a kernel filter that affects all subsequent units of the connectionist network. Instead the output can be passed on to several units, which can be of different types. In principle, it is possible to resample the input data in any desired way, wherein also a data reduction (e.g., a down-sampling) can be performed, i.e., the number of output picture elements can be lower than the number of input picture elements.

The saved computational resources can be used for a more accurate determination of the offsets. This can sometimes be achieved by way of increasing the number of units of the localization connectionist network. While the unit implementing the method described herein can appear only once, it is also possible to include a plurality of such units in one network.

According to another embodiment, the sampling does not comprise a convolution of the plurality of picture elements with a kernel filter. As mentioned above, this means that the output of the unit implemented by the method does not modify the data by means of a kernel or another type of filter that affects all subsequent units of the connectionist network. Instead the unit is a dedicated unit for resampling the input data by means of an individual grid, wherein certain characteristics in the image to be processed can be compensated in order to enhance the overall model performance.

The invention is also directed to a vehicle with a camera unit having an image sensor acquiring at least one image of an object in the vicinity of the vehicle, the vehicle further comprising a processing unit configured to carry out the method according to at least one of the embodiments described above. In an example, the processing unit may comprise a computer-readable storage device on which computer instructions representing at least one of the embodiments of the method described herein are stored. On the basis of the output data of the connectionist network, a vehicle behaviour can be modified automatically (e.g., in the context of autonomous driving) or a corresponding message like "maximum velocity of 80 kilometres per hour" can be generated and transmitted to a driver of the vehicle.

BRIEF DESCRIPTION OF DRAWINGS

The invention is described further in the following by means of exemplary embodiments shown in the enclosed drawings in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
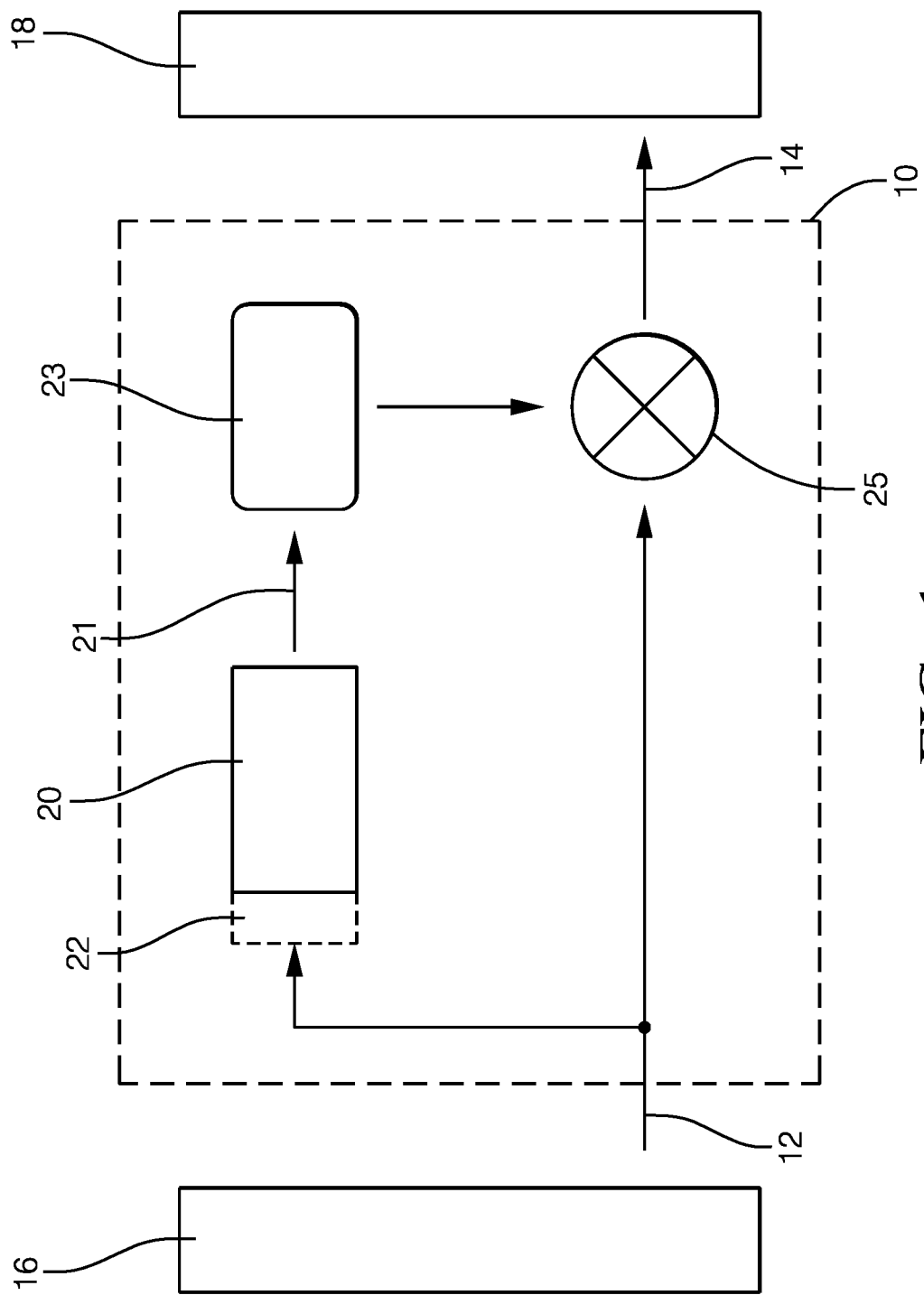
FIG. 1 shows a schematic view of a unit for processing image data of a connectionist network.

A unit 10 for processing image data in a connectionist network is shown in FIG. 1. The unit 10 comprises a data input 12 and a data output 14 wherein the data input 12 receives a feature matrix 16 comprising a plurality of input picture elements representing an image acquired by means of an image sensor (not shown in FIG. 1). A processed version of the feature matrix 16, a feature matrix 18, is outputted at the data output 14.

Within the unit 10, the feature matrix 16 is received by a localization connectionist network 20. A stop gradient layer 22 is only relevant during training of the unit 10, as will be addressed further below. The localization connectionist network 20, which can comprise one or more units (only one unit 10 is shown in FIG. 1) outputs a plurality of offsets 21, which are determined by means of the localization connectionist network 20. Within a subsequent grid generator 23, a grid is determined from the offsets 21 outputted by the localization connectionist network 20. Then the feature matrix 16 is sampled according the determined grid by means of a sampler 25. This gives a plurality of sampled picture elements. These sampled picture elements form the output feature matrix 18 outputted via the data output 14.

Figure 2:
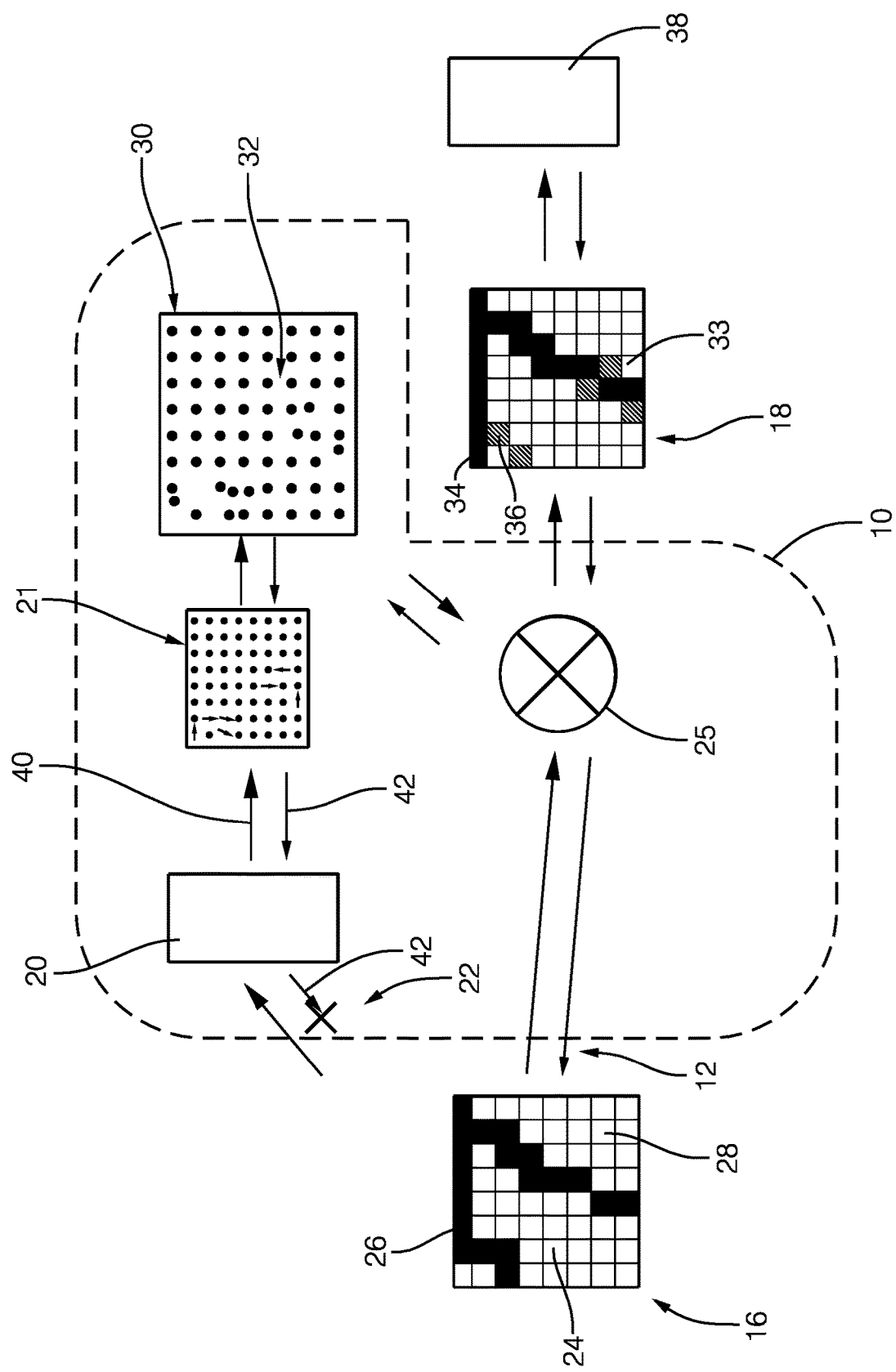
FIG. 2 shows another schematic view of a unit for processing image data of a connectionist network.

FIG. 2 illustrates the structure of the unit 10 of FIG. 1 by means of a concrete example, thereby further exemplifying the invention. The feature matrix 16 of FIG. 2 comprises a quadratic matrix of input picture elements 24, wherein the picture elements 24 are arranged in a regular grid-shaped manner. A portion 26 of the picture elements (indicated in black) forming a shape similar to the numeral seven have a high value, for example one. The remaining portion 28 of the picture elements (indicated in white) has a low value, for example zero. The offsets 21 outputted by the localization connectionist network 20 are partly indicated by respective arrows that each represent an individual location shift relative to one of the plurality of input picture elements 24 of the feature matrix 16. This is only a special case in which the number of input picture elements 24 and their arrangement in a quadratic feature matrix 16 is the same for a plurality of output picture elements forming the output feature matrix 18. In general, the input feature matrix 16 and the output feature matrix 18 can be different and can have any structure, e.g., in form of a two or three-dimensional matrix. If the matrices 16 and 18 are different, each of the offsets 21 can represent an individual location shift relative to one of the plurality of output picture elements forming the output feature matrix 16. The examples shown in the figures described herein all refer to the special case in which the number of input picture elements 24 and their arrangement matches the number and arrangement of the output picture elements forming the output feature matrix 18.

In the example of FIG. 2, only some of the offsets 21 comprise visible arrows indicating a location shift greater than zero. The remaining portion of the offsets 21 can be denoted as "zero offsets", which means that this portion of the offsets 21 define position shifts that are at least substantially zero.

FIG. 2 also includes a grid 30 determined from the offsets 21. The grid 30 comprises a plurality of sampling locations 32, wherein each of the sampling locations 32 is defined by a respective pair of one of the offsets 21 and an underlying input picture element 24 from the input feature matrix 16. As can be seen from FIG. 2, some of the sampling locations 32 are located offside the regular grid structure that may be inferred from the input feature matrix 16. These "offside sampling locations" are associated with those input picture elements 24 for which an offset 21 with a substantial location shift greater than zero has been determined (indicated by respective arrows). For each of the offside sampling locations an associated picture element is interpolated from the neighbouring input picture elements 24, for example by means of bilinear interpolation. This interpolation of picture elements is carried out in the sampler 25. The result of the sampling is the feature matrix 18 formed by a plurality of sampled picture elements 33. As can be seen in FIG. 2, the feature matrix 18 deviates from the input matrix 16 in those parts, which correspond to the locations of the arrows indicating the substantial offsets 21. In particular, the plurality of sampled picture elements 33 of the output feature matrix 18, which forms the plurality of output picture elements, comprises picture elements having an intermediate value, for example between one and zero. The sampled picture elements 34 and 36 are examples of picture elements having an intermediate value. This is indicated by a greyscale value, which corresponds to the value of the sampled picture element it represents. The values show the effect of the interpolation mentioned above.

In principle, all sampled picture elements 33 can be interpolated values. However, as can be seen in FIG. 2, a substantial portion of the sampling locations 32 of the grid 30 matches with the locations of the input picture elements 24 of the feature input matrix 16, i.e., the corresponding offsets 21 are zero offsets. In those special cases characterized by an identical configuration of the input picture elements 24 and the output picture elements, an interpolation of corresponding sampled picture elements can be avoided. Instead, the value of the input picture element 24 whose location matches with the desired sampling location 32 can directly be taken as sampled picture element 33, which then forms a part of the output feature matrix 18. In this way, computational time can greatly be reduced. This measure can also be taken for sampling positions 32 in close proximity to a respective location of an input picture element 24.

As the skilled person understands it can happen that an offset 21 with a substantial location shift greater than zero defines a sampling location 32 that exactly matches with the location of one of the input picture elements 24 already being part of the input feature matrix 16. In such a case, which can be quite rare, an interpolation can be avoided. Instead, the value of the input picture element 24 whose position matches with the desired sampling location 32 can directly be taken as sampled picture element 33, which then forms a part of the output feature matrix 18.

The output feature matrix 18 is transmitted to a subsequent unit 38 of the connectionist network, wherein the subsequent unit 38 can be, e.g., a convolutional layer in which the output feature matrix 18 is convolved with a kernel filter.

As is understood from the foregoing, the processing of the input feature matrix 16 by means of the unit 10 is determined by several processing parameters. In particular, determining of the offsets 21 by means of the localization network 20 is controlled by at least one, preferably by a plurality of processing parameters. Typically, the localization network 20 has a plurality of processing parameters, which need to be set to some value. In general, at least a portion of the processing parameters associated with the unit 10 need to be set to respective values. Preferably, these parameters are trained by means of an end-to-end learning algorithm, i.e., at least a substantial part, preferably all processing parameters of the network under training are determined by algorithmic means only on the basis of training data and without manual tuning of the processing parameters. In the example shown in FIG. 2, the localization connectionist network 20 is trained together with the connectionist network by means of the feed-forward algorithm and the back-propagation algorithm as set forth above. The feed-forward training is indicated by forward arrows 40 pointing from the left side of the page of FIG. 2 to the right side. The back-propagation training is indicated by backward arrows 42 pointing from the right side of the page of FIG. 2 to the left side. The stop gradient layer 22 already mentioned above is indicated by a respective backward arrow 42 between the feature input matrix 16 and the localization network 20, wherein the respective arrow 42 is crossed, thereby indicating that no training data information, e.g., gradient-related data (error propagation), is passed on from the localization network 20 to a preceding unit of the network (not shown in FIG. 2). The stop gradient layer 22 can be selectively activated.

Figure 3:
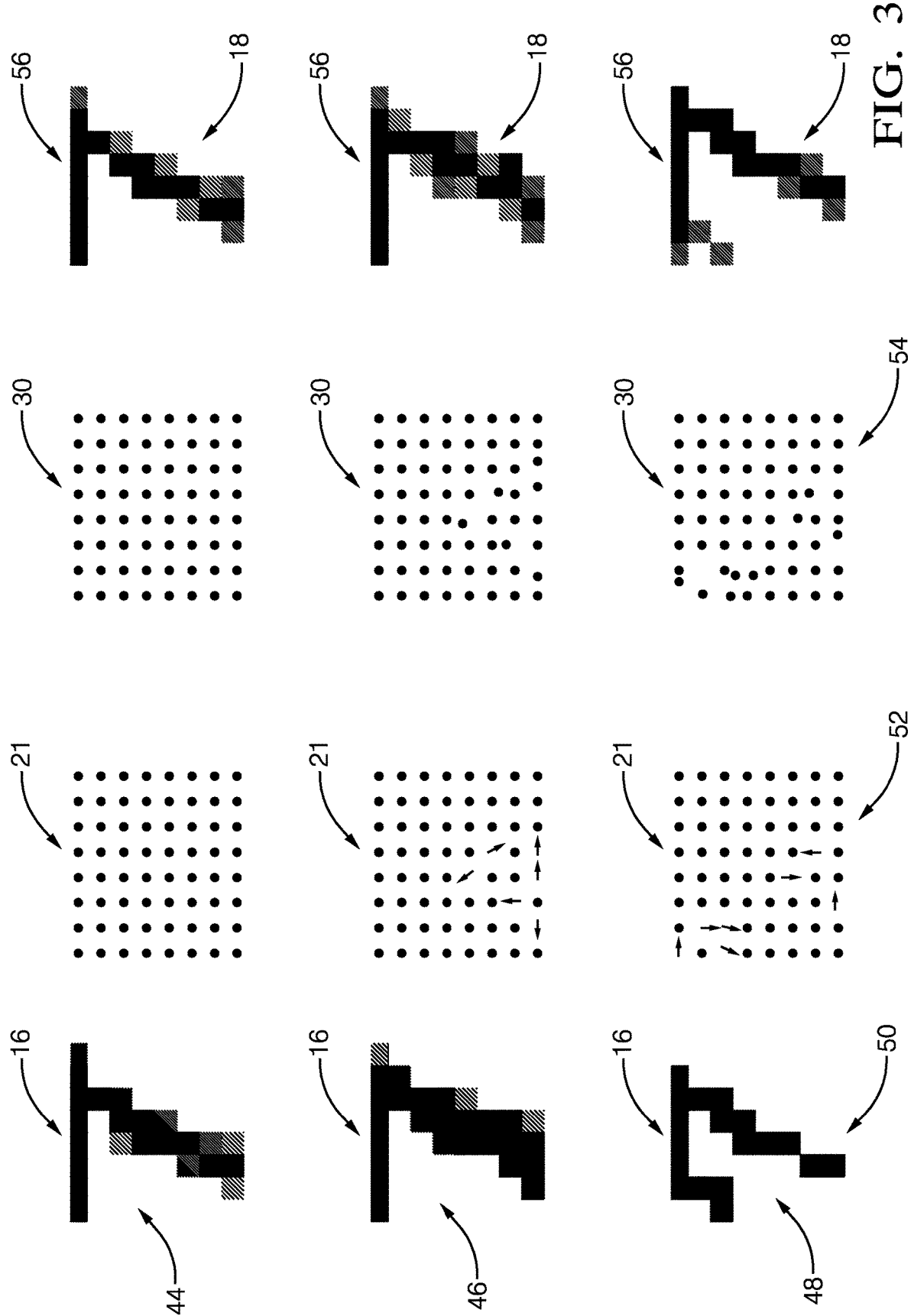
FIG. 3 show three examples illustrating processing of image data by means of the unit of FIG. 1.

FIG. 3 shows three examples 44, 46, 48 illustrating processing of image data by means of the unit 10 of FIGS. 1 and 2. The three examples 44, 46, 48 are arranged in three rows, wherein the third row corresponds to the example 48, which is also shown in FIG. 2. Columns 50, 52, 54, and 56 comprise the respective input feature matrices 16, the offsets 21, the grids 30, and the output feature matrices 18 of the examples 44, 46, 48, respectively. As can be seen from FIG. 3, the localization network 20 determines grids 30, which can be interpreted as being adapted to the respective input feature matrices 50, i.e., the offsets 21 of column 52 are exclusive for a respective input feature matrix 16. Some possible effects of the processing by means of the unit 10 can be inferred by comparing the examples 44, 46, 48 with each other.

Further examples 58, 60, 62, and 64 of processing image data by means of the unit 10 are shown in FIGS. 5a to 5d in which the examples 58, 60, 62, and 64 are arranged in columns. Row 66 comprises the raw feature matrices of the examples 58, 60, 62, and 64. Row 70 comprises the grids 30 of the examples 58, 60, 62, and 64. The middle row 68 comprises the input feature matrices 16 in an overlay with the grids 30 of the examples the examples 58, 60, 62, and 64. Note that the input feature matrices 16 of row 68 are already processed versions of the raw feature matrices of row 66, wherein the raw feature matrices are filtered by a convolution with a kernel filter. A notable effect of example 58 is that sampling locations 32 tend to be offside the prominent white line of the corresponding input feature matrix 16 of row 68. This can be interpreted as a compensation of the prominent white line as this line might deteriorate the performance of a classifier, which in the present case can be a classifier for the traffic signs in the raw input feature matrices of row 66.

Figure 4:
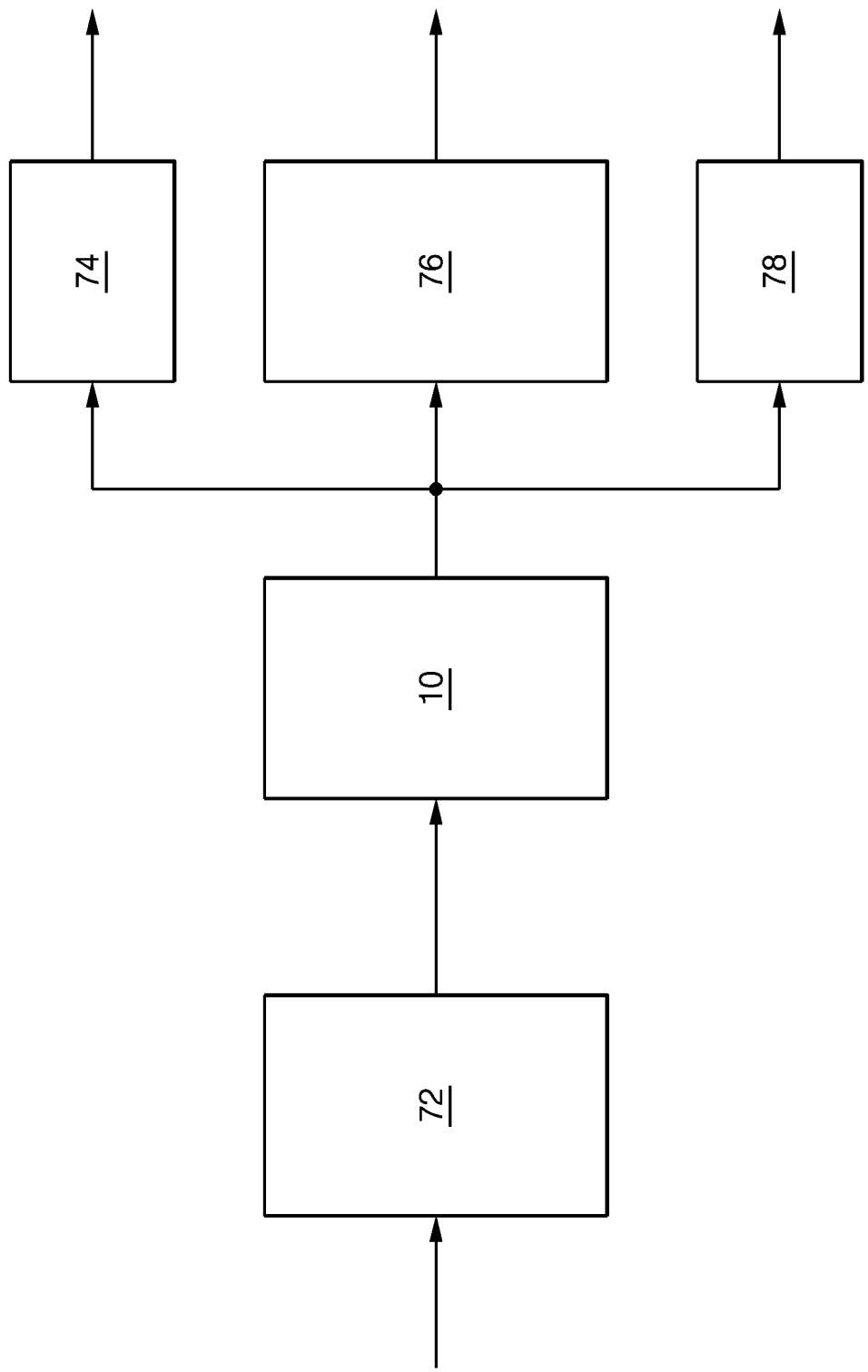
FIG. 4 shows a schematic view of a part of a connectionist network with the unit of FIG. 1.
Figures 5A, 5B, 5C, 5D:
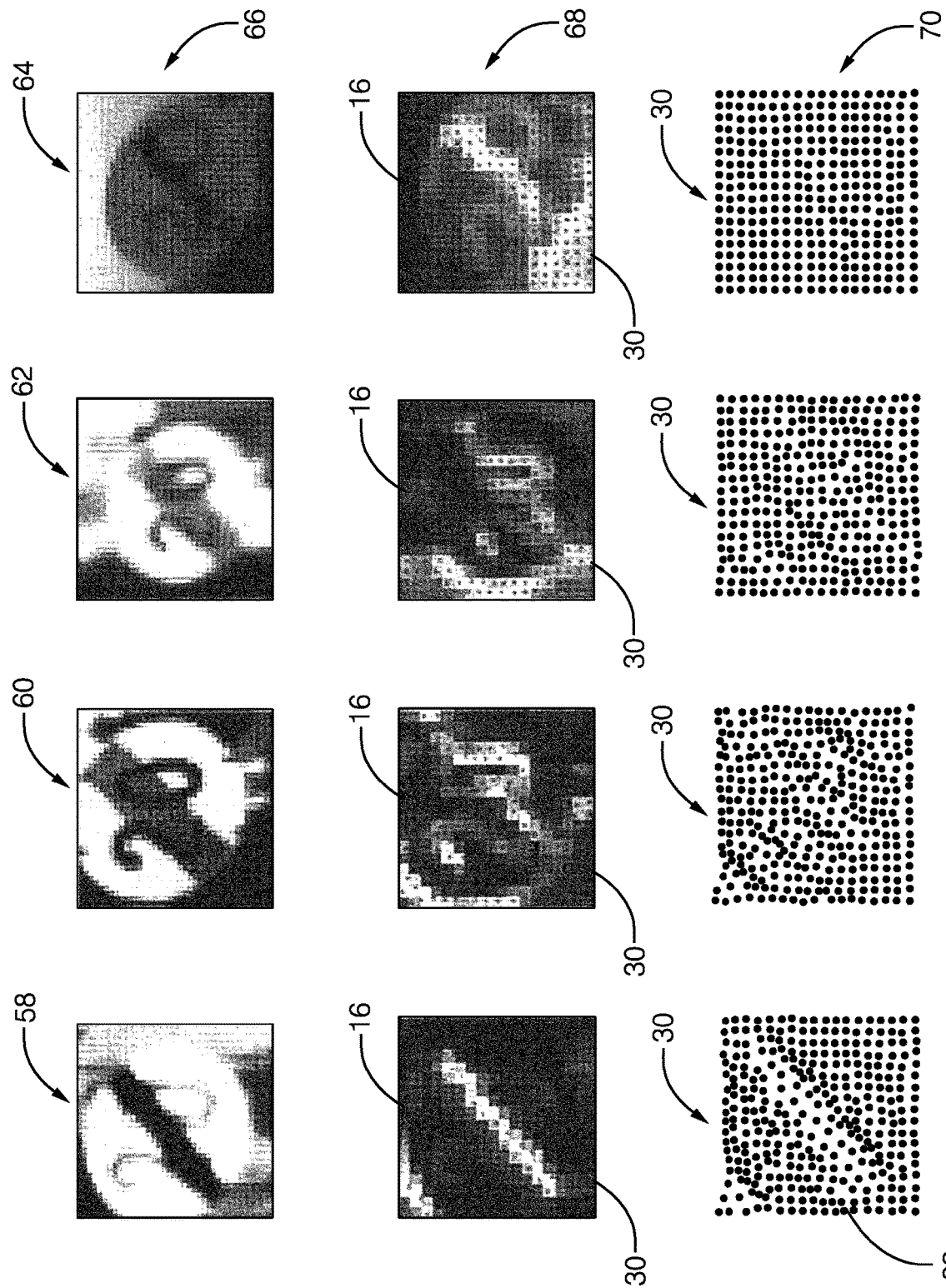
FIGS. 5a-5d show four further examples illustrating processing of image data by means of the unit of FIG. 1.

FIG. 4 shows a schematic view of a part of a connectionist network (not shown) with the unit 10 of FIGS. 1 and 2. The unit 10 has a preceding unit 72 and three subsequent units 74, 76, 78. This configuration shows a further advantage of the unit 10, namely that the outputted feature matrix 18 can be inputted into several subsequent units 74, 76, 78, i.e., the result of the "compensation resampling" performed by the unit 10 can be reused, wherein a convolution with the output feature matrix 18 can be dedicated to the subsequent units 74, 76, 78. This has been found to reduce the computational load during training and often leads to a network that is more effective in terms of performance and also has a reduced complexity, which is beneficial in view of minimizing the risk of overfitting.

We claim:

1. A method of processing image data in a connectionist network comprising a plurality of units, each unit having a data input, a data output, and at least one processing parameter, the processing of input data by the unit being at least partially determined by the at least one processing parameter of the unit, the method implementing at least a respective one of the plurality of units, the method comprising:
   receiving, as raw input data or input data processed by a preceding one of the plurality of units, a plurality of input picture elements representing an image acquired by an image sensor;
   determining, for a plurality of output picture elements, a plurality of offsets, each offset representing an individual location shift of an underlying one of the plurality of output picture elements;
   determining, from the plurality of offsets, a grid for sampling from the plurality of input picture elements, wherein the grid comprises a plurality of sampling locations, each sampling location being defined by a respective pair of one of the plurality of offsets and the underlying one of the plurality of output picture elements;
   sampling from the plurality of input picture elements in accordance with the grid, the sampling, for at least one of the plurality of sampling locations of the grid, comprising interpolating a respective one of the plurality of output picture elements associated with a respective one of the plurality of sampling locations when the respective one of the plurality of sampling locations is offside any of the plurality of input picture elements; and
   transmitting, as output data for at least a subsequent one of the plurality of units of the connectionist network, a plurality of sampled picture elements resulting from the sampling, the plurality of sampled picture elements forming the plurality of output picture elements.

2. The method according to claim 1, wherein the individual location shift represented by a respective one of the plurality of offsets defines an arbitrary location relative to the underlying one of the plurality of output picture elements.

3. The method according to claim 1, wherein at least some of the plurality of offsets are spatially limited to a predefined threshold.

4. The method according to claim 1, wherein determining the plurality of offsets is carried out by a localization connectionist network, in particular a neural network, comprising:
   one or more units, each unit having a data input, a data output, and at least one processing parameter, wherein processing of the input data by means of the one or more units is at least partially determined by the at least one processing parameter.

5. The method according to claim 4, wherein:
   the one or more units of the localization connectionist network are convolutional units;
   a respective convolutional unit implements a convolution of at least some of the plurality of input picture elements received by the respective convolutional unit with a kernel filter; and
   the sampling does not comprise a convolution with a kernel filter.

6. The method according to claim 4, wherein:
   the localization connectionist network is trained together with the connectionist network by a feed-forward algorithm and a back-propagation algorithm; and
   training comprises modifying the at least one processing parameter of at least some of the plurality of units of the connectionist network or of the one or more units of the localization connectionist network.

7. The method according to claim 6, wherein during training of the localization connectionist network and the connectionist network and if the unit implemented by the method receives input data processed by a preceding one of the plurality of units of the connectionist network, training data from the localization connectionist network is selectively not used for modifying the at least one processing parameter of the preceding one of the plurality of units of the connectionist network.

8. The method according to claim 6, the localization connectionist network and the connectionist network are trained before using the connectionist network for a predefined purpose.

9. The method according to claim 1, wherein:
   at least one of the plurality of units of the connectionist network is a convolutional unit; and
   a respective convolutional unit implements a convolution of at least some of the plurality of input picture elements or output picture elements received by the respective convolutional unit with a kernel filter.

10. The method according to claim 1, wherein the connectionist network implements a classifier for at least parts of the image represented by the plurality of input picture elements.

11. The method according to claim 1, wherein the connectionist network implements a classifier for traffic signs.

12. The method according to claim 1, wherein the output picture elements are transmitted as output data to a plurality of subsequent units of the connectionist network.

13. The method according to claim 1, wherein the sampling does not comprise a convolution of the plurality of input picture elements with a kernel filter.

14. A system comprising:
one or more processors configured to process image data in a connectionist network comprising a plurality of units, each unit having a data input, a data output, and a processing parameter, processing of the image data comprising:
receiving, as raw input data or input data processed by a preceding one of the plurality of units, a plurality of input picture elements representing an image acquired by an image sensor;
determining, for a plurality of output picture elements, a plurality of offsets, each offset representing an individual location shift of an underlying one of the plurality of output picture elements;
determining, from the plurality of offsets, a grid for sampling from the plurality of input picture elements, wherein the grid comprises a plurality of sampling locations, each sampling location being defined by a respective pair of one of the plurality of offsets and the underlying one of the plurality of output picture elements;
sampling from the plurality of input picture elements in accordance with the grid, the sampling, for at least one of the plurality of sampling locations of the grid, comprising interpolating a respective one of the plurality of output picture elements associated with a respective one of the plurality of sampling locations when the respective one of the plurality of sampling locations is offside any of the plurality of input picture elements; and
transmitting, as output data for at least a subsequent one of the plurality of units of the connectionist network, a plurality of sampled picture elements resulting from the sampling, the plurality of sampled picture elements forming the plurality of output picture elements.

15. The system of claim 14, wherein the individual location shift represented by a respective one of the plurality of offsets defines an arbitrary location relative to the underlying one of the plurality of output picture elements.

16. The system of claim 14, wherein the processor is configured to determine the plurality of offsets by at least:
using a localization connectionist neural network comprising:
one or more units, each unit having a data input, a data output, and at least one processing parameter, wherein processing of the input data by means of the one or more units is at least partially determined by the at least one processing parameter.

17. The system of claim 16, wherein:
the one or more units of the localization connectionist neural network are convolutional units;
a respective convolutional unit implements a convolution of at least some of the plurality of input picture elements received by the respective convolutional unit with a kernel filter; and
the sampling does not comprise a convolution with a kernel filter.

18. The system of claim 16, wherein:
the localization connectionist neural network is trained together with the connectionist network by a feed-forward algorithm and a back-propagation algorithm; and
training comprises modifying the at least one processing parameter of at least some of the plurality of units of the connectionist network or of the one or more units of the localization connectionist network.

19. The system of claim 14 wherein the system is a vehicle.

20. A non-transitory computer-readable storage device comprising instructions that, when executed, configure a processor to process image data in a connectionist network comprising a plurality of units, each unit having a data input, a data output, and a processing parameter, processing of the image data comprising:
receiving, as raw input data or input data processed by a preceding one of the plurality of units, a plurality of input picture elements representing an image acquired by an image sensor;
determining, for a plurality of output picture elements, a plurality of offsets, each offset representing an individual location shift of an underlying one of the plurality of output picture elements;
determining, from the plurality of offsets, a grid for sampling from the plurality of input picture elements, wherein the grid comprises a plurality of sampling locations, each sampling location being defined by a respective pair of one of the plurality of offsets and the underlying one of the plurality of output picture elements;
sampling from the plurality of input picture elements in accordance with the grid, the sampling, for at least one of the plurality of sampling locations of the grid, comprising interpolating a respective one of the plurality of output picture elements associated with a respective one of the plurality of sampling locations when the respective one of the plurality of sampling locations is offside any of the plurality of input picture elements; and
transmitting, as output data for at least a subsequent one of the plurality of units of the connectionist network, a plurality of sampled picture elements resulting from the sampling, the plurality of sampled picture elements forming the plurality of output picture elements.

* * * * *